UNITED STATES PATENT OFFICE.

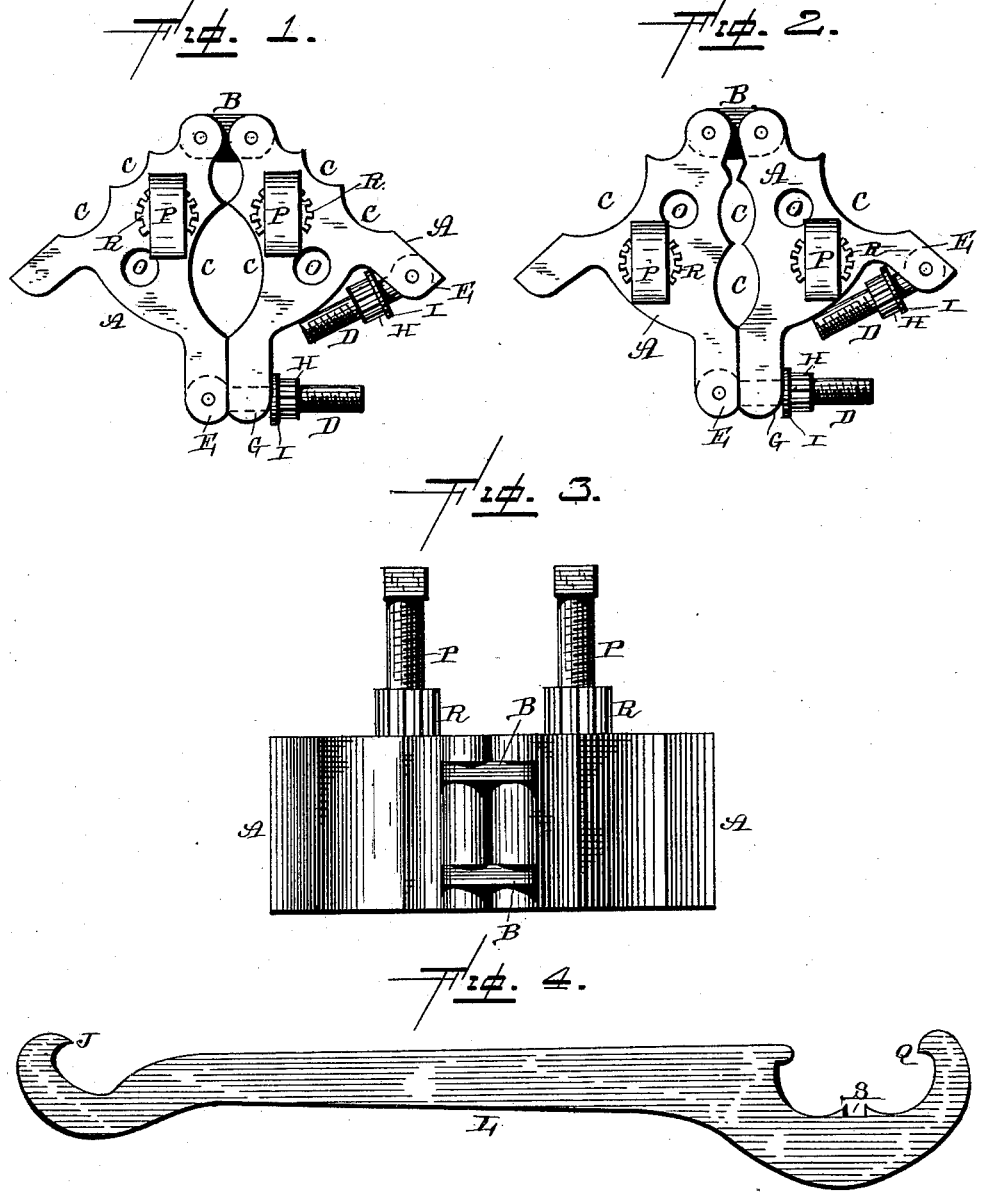

SPENCER McCAY, OF TOPEKA, KANSAS.

TIRE-TIGHTENER.

SPECIFICATION forming part of Letters Patent No. 296,987, dated April 15, 1884.

Application filed October 22, 1883. (No model.)

*To all whom it may concern:*

Be it known that I, SPENCER McCAY, of Topeka, in the county of Shawnee and State of Kansas, have invented certain new and useful Improvements in Tire-Tighteners; and I do hereby declare the following to be a full, clear, and exact description of the invention, such as will enable others skilled in the art to which it pertains to make and use it, reference being had to the accompanying drawings, which form part of this specification.

My invention relates to an improvement in tire-tighteners; and it consists, first, in the combination of two blocks or castings, which have different-sized grooves or recesses formed in their sides, and which are hinged or otherwise loosely connected together, so that either one of their grooved sides may be brought together, and thus adapt the casting to be applied to spokes of different sizes; second, in the combination of two castings, which are connected together by means of links, and which have different-sized grooves formed in their faces, with two clamping devices, whereby the grooved faces of the two blocks may be reversed, so as to accommodate them to different-sized spokes; third, in the combination and arrangement of parts, which will be more fully described hereinafter.

The object of my invention is to provide a tire-tightener provided with a number of different-sized grooves, so as to adapt it to be clamped to from the smallest to the largest sized spokes, and which is made reversible, so as to bring either the large or the small grooves into play, and which can be quickly and readily attached to the spokes, and the felly then forced outward, so that suitable washers can be placed between the ends or shoulder of the spokes and the inner side of the felly.

Figures 1 and 2 are plan views of a tire-tightener embodying my invention, showing the two parts in different positions. Fig. 3 is a side elevation of the same. Fig. 4 is a detail view of the lever by means of which the nuts are turned.

A represents two castings, made nearly triangular in shape, and which are loosely connected or hinged together by means of the links B. These links are just sufficiently long to allow the blocks or castings to be reversed in position, as shown in Figs. 1 and 2. Each one of these blocks or castings has a number of grooves, C, made in two of its faces, which grooves are of different sizes, so as to fit any sized spokes, from the smallest up to the largest that are used. These grooves C are made in opposite faces of each block, and these faces, when brought together, can be readily clamped in position by means of the clamping-bolts D, which are pivoted at one corner between suitable ears or projections, E, which are formed upon one block, and which catch in a corresponding slot, groove, or depression, G, in the opposite corner or edge of the other block. Each one of these bolts has a grooved nut, H, and a washer, I, applied to it, and by means of these nuts and washers the blocks can be clamped to a spoke with sufficient force to hold them in position while the felly is being forced outward. These nuts are made grooved, as shown, so that the hook or projection J, upon the small end of the lever L, can be made to catch in them and turn them readily and easily. Owing to the shape of the hook and the grooves in the nut, the lever L can be used much more rapidly and easily than a wrench or any other similar device. Each of the blocks is cast hollow, so as to make them as light as possible, but are closed over at their tops, and through this top are made suitable openings, O, through which the lower ends of the jack-screws P are passed. The upper ends of each of these screws are provided with a suitably-shaped head for catching against the inner side of the felly, and upon each screw is placed a grooved nut, R. These nuts serve, when turned in the proper direction, to force the jack-screws outward, and thus force the felly outward for the purpose of allowing washers to be placed between the shoulder on the outer end of the spoke and the inner side of the felly. These nuts are also grooved, as already described, so that one of the points or projections, Q, upon the lever L will catch therein at the same time that the groove S in the lever catches over one of the teeth or flanges on the nut. Only one of the points or projections Q is brought into use at the same time, and then one operates only in connection with the groove S. By means of this construction of the lever and the nuts the lever can be operated rapidly and easily where there would not be sufficient room to enable a wrench to be used to any advantage.

In using this tire-tightener, those faces of the two blocks A are brought together which have a groove, C, which is best adapted to the size of the spoke in the wheel. These blocks are then rigidly secured to a spoke by means of the clamping-bolt, which is brought into play, and then the lever is applied to the nuts upon the jack-screws, for the purpose of forcing the felly outward. The jack-screws are placed in the holes made through the tops of the blocks, which will bring the screws directly under the felly. After the felly has been forced out a suitable distance and the washers have been applied, the jack-screws may either be turned outward by means of the lever and then the blocks removed, or the blocks removed without the trouble of turning the screws, as may be preferred.

Having thus described my invention, I claim—

1. In a tire-tightener, the combination of the two-grooved reversible blocks, which are loosely connected together with suitable clamping devices, substantially as shown.

2. In a tire-tightener, the combination of the two reversible blocks loosely connected together, and provided with grooves of different sizes in their opposite faces, with the clamping devices for securing the blocks to a spoke, and suitable jack-screws for forcing the felly outward, substantially as described.

3. The combination, in a tire-tightener, of the two blocks loosely connected together, and provided with different-sized grooves upon their opposite faces, and provided with a series of holes through their tops, with the clamping devices for holding them together, and the jack-screws, substantially as set forth.

4. In a tire-tightener, the combination of the two blocks A, grooved upon opposite faces, and loosely connected together by the link B, the pivoted screw-bolts D, provided with nuts H, the jack-screws P, grooved nuts R, and a suitable device for turning the nuts, substantially as specified.

In testimony whereof I affix my signature in presence of two witnesses.

SPENCER McCAY.

Witnesses:
WILLIAM R. HAZEN,
ED. A. BATWELL.